No. 733,035. PATENTED JULY 7, 1903.
H. M. HARDING.
MEANS FOR VARYING THE SPEED OF OVERHEAD ELECTRIC CARRIERS.
APPLICATION FILED AUG. 22, 1902.
NO MODEL. 2 SHEETS—SHEET 1.
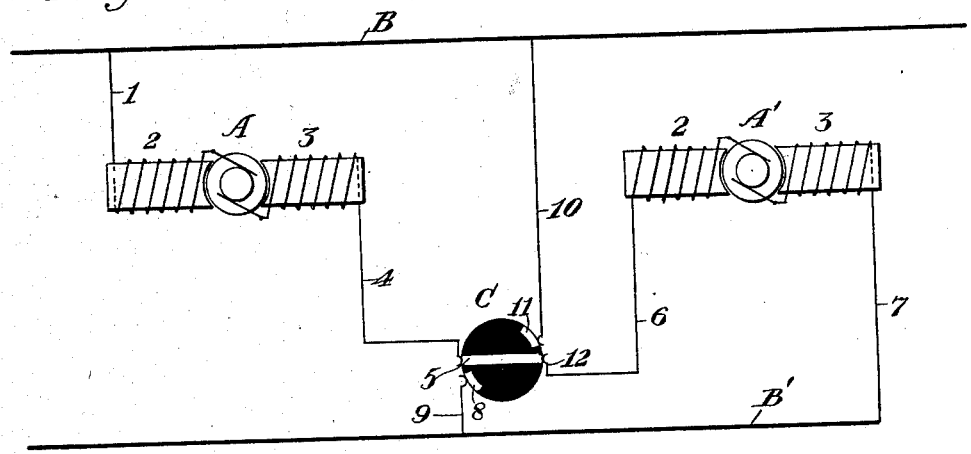
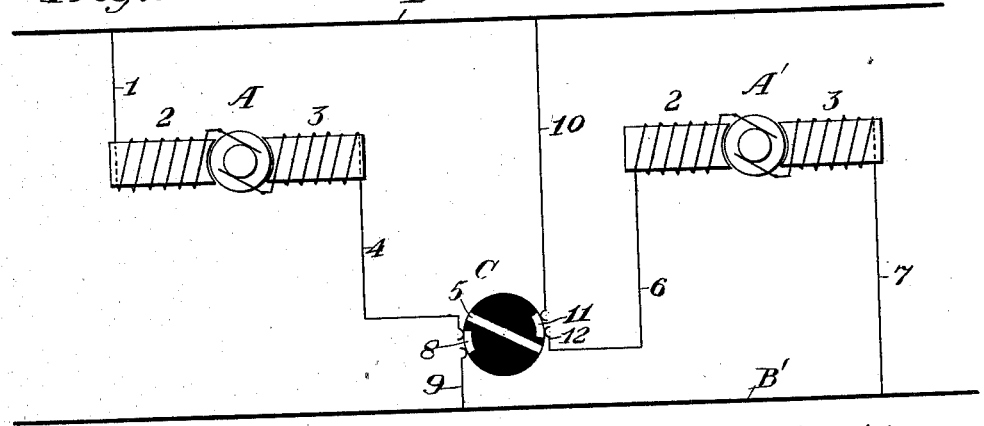
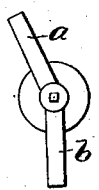 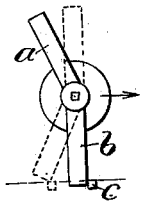 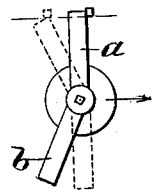

No. 733,035. PATENTED JULY 7, 1903.
H. M. HARDING.
MEANS FOR VARYING THE SPEED OF OVERHEAD ELECTRIC CARRIERS.
APPLICATION FILED AUG. 22, 1902.
NO MODEL. 2 SHEETS—SHEET 2.

No. 733,035.

Patented July 7, 1903.

UNITED STATES PATENT OFFICE.

HENRY M. HARDING, OF NEW YORK, N. Y.

MEANS FOR VARYING THE SPEED OF OVERHEAD ELECTRIC CARRIERS.

SPECIFICATION forming part of Letters Patent No. 733,035, dated July 7, 1903.

Application filed August 22, 1902. Serial No. 120,632. (No model.)

*To all whom it may concern:*

Be it known that I, HENRY M. HARDING, residing at New York, in the county and State of New York, have invented certain new and useful Improvements in Means for Varying the Speed of Overhead Electric Carriers, of which the following is a specification.

The object of my invention is to provide automatic means for varying the speed of overhead electric carriers according to the grade or other condition of the track.

Figure 3:
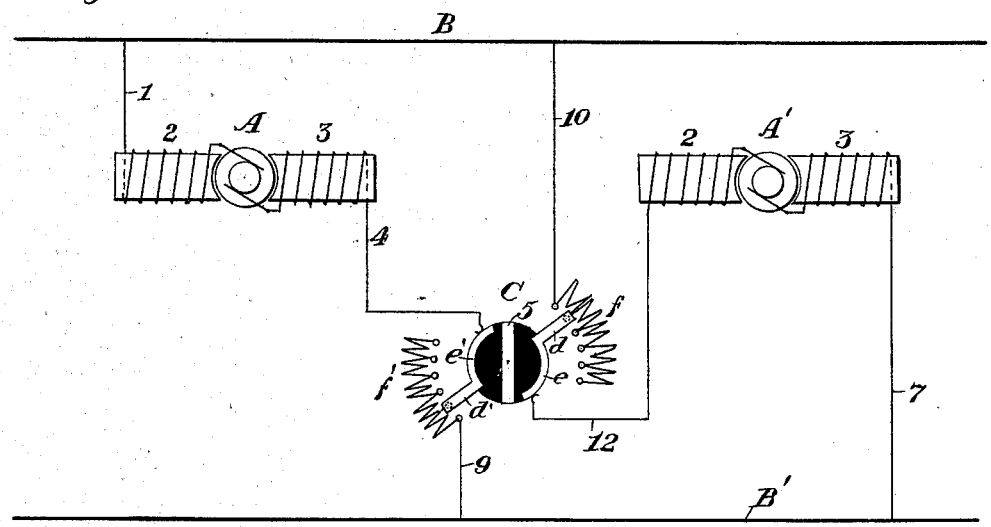
Figure 4:
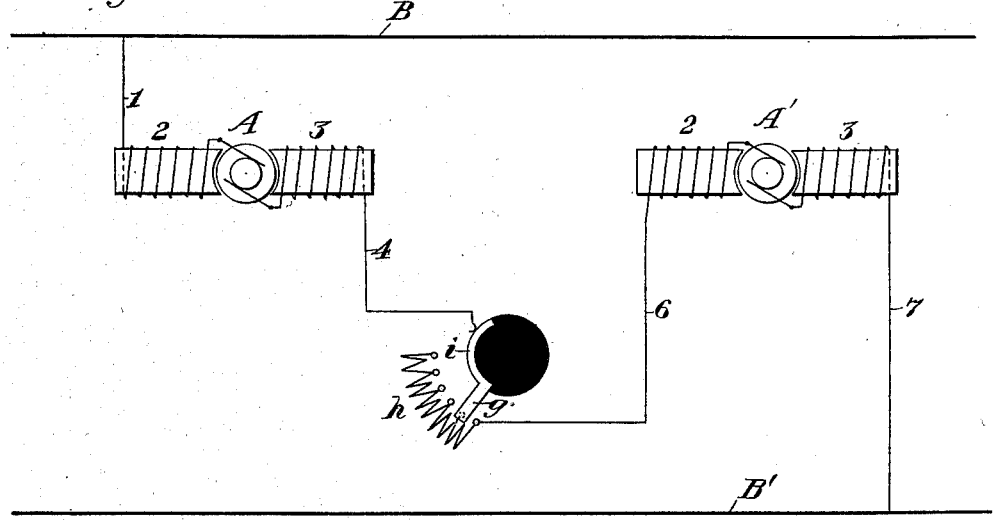

Figures 1 and 2 represent diagrammatically means for varying the manner in which the motors are coupled. Fig. 3 shows diagrammatically means for varying the speed by the use of resistance in the circuit. Fig. 4 is a diagram showing modified views of the same. Figs. 5, 6, and 7 show diagrammatically the means by which the switch is operated.

I have used to illustrate my invention two series motors which normally would be coupled in series, and part of my invention consists in changing automatically the coupling of these motors from series to parallel.

Referring particularly to Figs. 1 and 2, A A' represent series motors, the circuits from which are as follows: through overhead wire or conductor B, through wire 1, around the field-magnet 2, through the armature of motor A, through the other field-magnet 3, wire 4, to switch C. The wire 4 in this arrangement makes contact with the contacting strip 5 of said switch, through which the current passes to wire 6 and through the field-magnets and armature of the motor A' and down through wire 7 to the return-wire B'. Where a steep grade or other exigency requires increased power, I provide means, hereinafter described, for automatically throwing the switch, so that the motors instead of being coupled in series will be coupled in parallel. Upon the turning of the switch the end wires 4 and 6 will be thrown out of contact with the connecting-strip 5 and new circuits will be established as follows: from the overhead conductor B and through the first motor-wire 4 to contact-piece 8, through said piece to the end of wire 9, and through said wire to the return-wire B'. The current for the second motor passes from the overhead conductor B', through wire 10 to contact-piece 11 on the switch, through said piece to the end wire 12, through said wire around the motor A, and through wire 7 to the return-circuit, thus coupling the motors in parallel. The method of operating this switch is as follows: The switch is provided with arms *a b*, and supported at the desired positions on the overhead track are contact-pieces *c*, so arranged as to strike the arms *a b* and turn the switch when the motor passes. It will be obvious that these contacts may be placed in any position to throw the switch either one way or the other or to move it any predetermined part of a rotation.

In Fig. 3 I have illustrated a method of varying speed by means of placing resistance in the circuit, the motors being shown as coupled in parallel. In this case the switch is provided with arms *d d'*, of conducting material, which are in electrical contact with conducting-pieces *e e'* on the switch, the ends of which bear upon contact-points of resistance-coils *f f'*. The conducting-strip 5 is so placed that in the normal position the motors are coupled in series, as heretofore described. The switch is so proportioned that when the coupling is changed from series to parallel no resistance is thrown into the circuit. Should resistance be necessary when the motors are so coupled, a further movement of the switch will cause resistance to be thrown in, the circuit being established as follows: through wire 1 and the field and armature of the motor A, through wire 4 to contact-piece *e'*, through the arm *d'* and resistance-coil *f'*, wire 9, and the return-wire; for the second motor, through wire 10, through resistance *f*, arm *d*, contact-piece *e*, wire 12, through field and armature of motor A', and wire 7 to the return-wire. It is obvious that the farther the switch is turned the more resistance will be thrown in.

In Fig. 4 I have shown a method of varying the speed in which the motors remain coupled in series. In this case the switch carries an arm *g*, adapted to travel over the contact-points of resistance *h*. This arm is also in electrical contact with the contact-piece I on the switch. The motors are then coupled in series, the circuit being through motor A, wire 4, contact-piece I, to and through *g*, wire 6, to and through motor A' and wire 7 to the return-circuit. To one end of the resistance-coil or rheostat is attached the wire 6, running to the motor A'. In its normal position the arm $g$ is on the end contact of the rheostat, and consequently no resistance is thrown in, the circuit being made through the motors, as clearly indicated in the figure. If the switch be moved, the arm $g$ will travel over the contacts of the rheostat and throw in resistance in proportion to the distance which it is moved, as will be readily observed.

While I have illustrated my invention with motors of the series type, it will be evident that the same principle can be applied to any form of motors, either shunt or compound, and that the speed may be varied either by changing the manner in which the motors are coupled or by use of resistance in any of the well-known ways.

What I claim, and desire to secure by Letters Patent, is—

In an overhead electric carrier the combination of motors, means for changing the connection of said motors from series to parallel or the reverse, and automatic means for causing these changes at predetermined points, substantially as described.

In witness whereof I have hereunto set my hand, in the city, county, and State of New York, this 16th day of August, 1902.

HENRY M. HARDING.

Witnesses:
JOHN J. RANAGAN,
H. J. LILLER.